United States Patent

Hamilton et al.

Patent Number: 5,950,001
Date of Patent: Sep. 7, 1999

[54] METHOD AND APPARATUS FOR CUSTOMIZING A SOFTWARE COMPONENT

[75] Inventors: Graham Hamilton, Palo Alto; Laurence P. G. Cable, Mountain View, both of Calif.

[73] Assignee: Sun Microsystems, Inc., Palo Alto, Calif.

[21] Appl. No.: 08/868,293

[22] Filed: Jun. 3, 1997

[51] Int. Cl.$^6$ .................................. G06F 9/06; G06F 9/44
[52] U.S. Cl. .................. 395/701; 395/702; 395/710; 707/103; 707/102; 707/3; 709/303; 709/305; 345/333; 345/335; 345/339; 345/352
[58] Field of Search .................. 395/701, 705, 395/682, 683, 710, 702; 345/326, 333, 335, 339, 352–354, 433; 707/100, 102–104, 1, 3; 709/303, 305

[56] References Cited

U.S. PATENT DOCUMENTS

| | | | |
|---|---|---|---|
| 5,490,245 | 2/1996 | Wugofski | 345/348 |
| 5,600,778 | 2/1997 | Swanson et al. | 345/333 |
| 5,603,034 | 2/1997 | Swanson | 395/701 |
| 5,682,510 | 10/1997 | Zimmerman et al. | 345/352 |
| 5,745,765 | 4/1998 | Paseman | 395/701 |
| 5,754,858 | 5/1998 | Broman et al. | 395/701 |
| 5,764,226 | 6/1998 | Consolatti et al. | 345/333 |
| 5,778,227 | 7/1998 | Jordan | 395/682 |
| 5,784,583 | 7/1998 | Redpath | 345/353 |
| 5,787,431 | 7/1998 | Shaughnessy | 707/100 |
| 5,790,855 | 8/1998 | Faustini | 395/701 |
| 5,794,006 | 8/1998 | Sanderman | 395/500 |
| 5,884,078 | 3/1999 | Faustini | 395/701 |

OTHER PUBLICATIONS

Graham Hamilton, JavaBeans™, Jul. 24, 1997, Sun Microsystems, pp. 1–114.

*Primary Examiner*—Tariq R. Hafiz
*Assistant Examiner*—Tuan Q. Dam
*Attorney, Agent, or Firm*—Beyer & Weaver, LLP

[57] ABSTRACT

The present invention provides efficient methods, apparatuses, and products for customizing software components intended for use in application builder tools. In accordance with one aspect of the present invention, a method of customizing a component which has at least one associated property involves obtaining the component and then identifying a customizer that is arranged to be associated with the component. Such a customizer is further arranged to guide a user through the configuration of the component.

27 Claims, 5 Drawing Sheets

METHOD AND APPARATUS FOR CUSTOMIZING A SOFTWARE COMPONENT

CROSS REFERENCE TO RELATED APPLICATION

U.S. patent application Ser. No. 08/868,038, entitled "Method and Apparatus for Editing a Software Component," filed concurrently herewith, is related to the present application and is incorporated herein by reference in its entirety.

BACKGROUND OF THE INVENTION

1. Field of Invention

The present invention relates generally to methods and apparatus for use in application builder tools, and more particularly, to methods and apparatus for use in customizing software components.

2. Background

As computer usage becomes increasingly widespread, the desire for custom computer applications which are specific to the needs of a particular user is also increasing. The use of visual builder tools, or application builder tools, enables computer applications to be readily created. Builder tools generally include standard sets of software modules, or "building blocks," which can be interlinked to create custom-built applications.

Many visual based applications builder tools, as for example Visual Basic, available from Microsoft, Inc. of Redmond, Wash., have a graphical user interface which includes a "toolbox", a "form window", and a "property sheet". A toolbox typically contains icons which represent different classes of components, or software modules. Alternatively, the toolbox may contain text which represents different classes of components. It should be appreciated that many different classes of components may exist. By way of example, different classes can include complex components, e.g., database viewers, and simple components, e.g., buttons. A form window is a display window in which an application may be composed. A component selected from the toolbox may be "dropped", or otherwise placed, within the form window. Placing a component refers to placing an icon, or a screen representation of the component, within the form window. A property sheet displays properties, or attributes, which relate to the selected component. The properties can include, but are not limited to, information relating to the size, color, and name of the selected component.

In general, a property sheet displays a fixed set of properties which can be modified to customize, or configure, a given component. Hence, a user can select and modify different properties in the property sheet in order to customize a component. Simple components typically have fewer associated properties than larger components, and can therefore be readily customized by making selections in a property sheet. Customizing larger components, e.g., a database, by selecting different properties from the property sheet, however, often proves to be inefficient, as the number of different properties displayed in the property sheet can be high. Since larger components can also be customized in a number of different ways, customizing larger components as desired by a user can prove to be extremely time-consuming. By way of example, due to the fact that changes to one property often logically require changes to another property, a user must often locate "related" properties, then determine an efficient order in which to modify the related properties. Further, with many different properties which can be customized, the likelihood of mistakenly modifying a property during the customization process increases with the size of a component. As the possibility that a property may be inadvertently or incorrectly modified increases, it follows that the chances of incorrectly customizing a component also increase. Thus, improperly customized components can be used as a part of an application, thereby compromising the quality of the application which uses the components.

Therefore, what is desired is a method and an apparatus which enables a component to be efficiently and accurately customized. Specifically, what is desired is a guide, or a user interface, which directs a user through the steps associated with customizing a component.

SUMMARY OF THE INVENTION

The present invention provides efficient methods, apparatuses, and products for customizing software components intended for use in application builder tools. In accordance with one aspect of the present invention, a method of customizing a component which has at least one associated property involves obtaining the component and then identifying a customizer that is arranged to be associated with the component. Such a customizer is further arranged to guide a user through the configuration of the component.

In one embodiment, once the customizer is identified, the customizer, which is arranged to modify the property, is associated with the component. In such an embodiment, the component is configured using the customizer, as the customization of the component involves the modification of the property associated with the component. When there is more than one property associated with the component, each property may be modified in order to customize the component. In another embodiment, the customizer has a graphical user interface that is arranged to facilitate the modification of a property associated with the component. In still another embodiment, customization options associated with a property are generated.

In yet another embodiment, the customizer is created by identifying a property associated with the component, identifying at least one design choice associated with the property, and creating an organizational structure which includes the design choice. In such an embodiment, a user interface which is arranged to support user-interaction is created for the organizational structure.

In accordance with another aspect of the present invention, a computer-implemented method of customizing a component, which has at least one associated property, that is to be used with an application builder tool involves generating customization options and modifying the property using the customization options. The customization options are associated with a customizer and are arranged to support the modification of the property.

In one embodiment, the component is an instance of a component class and the customizer is an instance of a customizer class. In such an embodiment, the customizer is obtained from the customizer class, and the component, which is associated with the customizer, is obtained from the component class. In another embodiment, customization options are generated through user interaction with the customizer. In still another embodiment, the customizer includes an organizational structure which has at least one design option associated with the property, and a user interface associated with the organizational structure.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Certain embodiments of a method and apparatus for customizing software components will be described below making reference to the accompanying drawings.

Figure 1:
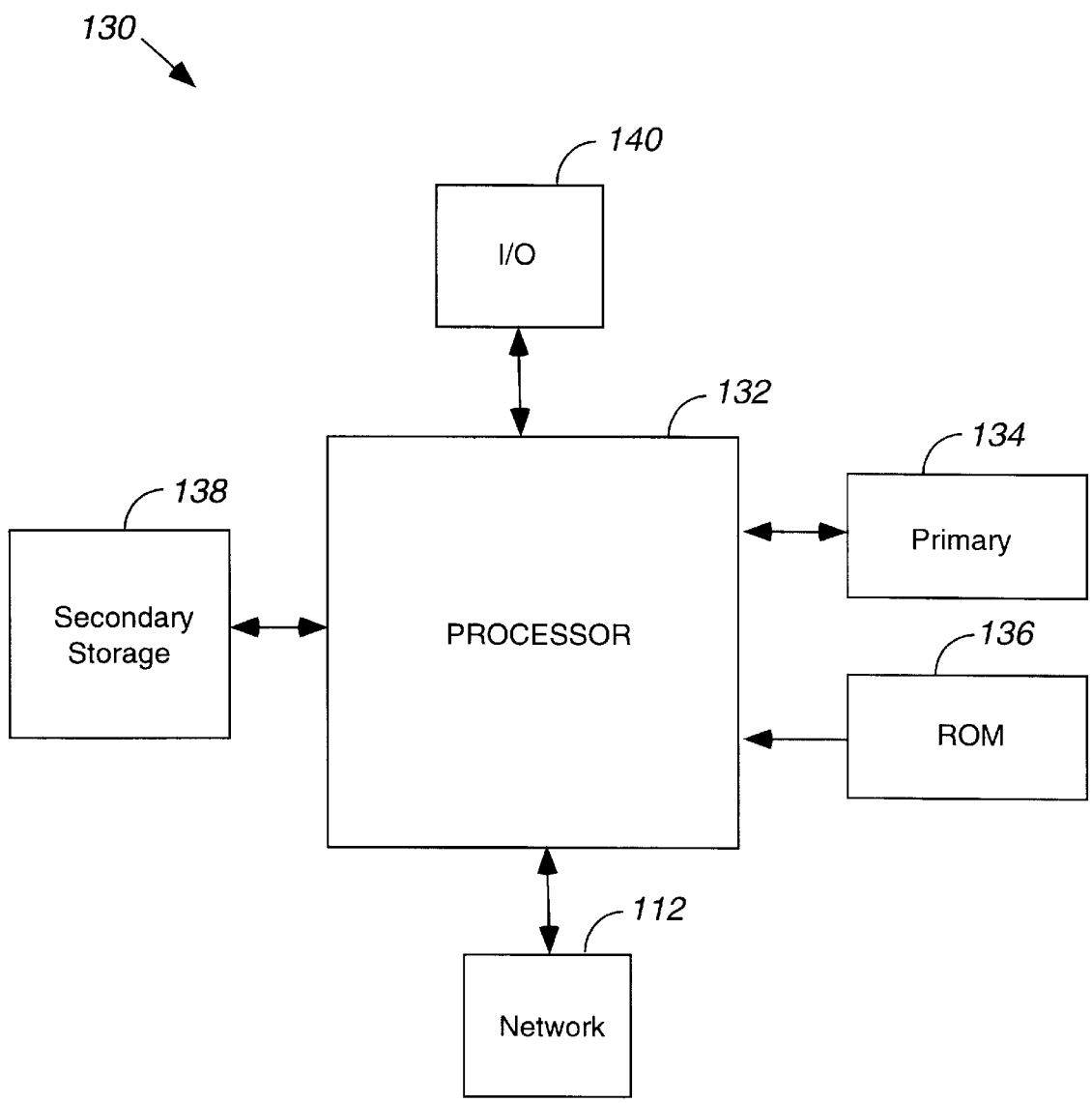
FIG. 1 is a diagrammatic representation of a computer system suitable for implementing the present invention.

FIG. 1 illustrates a typical computer system suitable for implementing the present invention. The computer system 130 includes any number of processors 132 (also referred to as central processing units, or CPUs) that are coupled to memory devices including primary storage devices 134 (typically a read only memory, or ROM) and primary storage devices 136 (typically a random access memory, or RAM). As is well known in the art, ROM 134 acts to transfer data and instructions uni-directionally to the CPU 132, while RAM 136 is used typically to transfer data and instructions in a bi-directional manner. Both primary storage devices 134, 136 may include any suitable computer-readable media. A mass memory device 138 is also coupled bi-directionally to CPU 132 and provides additional data storage capacity. The mass memory device 138 may be used to store programs, data and the like and is typically a secondary storage medium such as a hard disk that is slower than primary storage devices 134, 136. Mass memory storage device 138 may take the form of a magnetic or paper tape reader or some other well-known device. It will be appreciated that the information retained within the mass memory device 138, may, in appropriate cases, be incorporated in standard fashion as part of RAM 136 as virtual memory. A specific mass storage device such as a CD-ROM 134 may also pass data uni-directionally to the CPU.

CPU 132 is also coupled to one or more input/output devices 140 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 132 optionally may be coupled to a computer or telecommunications network, e.g., an Internet network or an intranet network, using a network connection as shown generally at 112. With such a network connection, it is contemplated that the CPU 132 might receive information from the network, or might output information to the network in the course of performing the above-described method steps. The above-described devices and materials will be familiar to those of skill in the computer hardware and software arts.

Application builder tools, which are used to construct custom applications for use on computer systems, include components that can be linked together to form applications. To simplify the construction of custom computer applications, application builder tools, or, more specifically, visual application builder tools, e.g., Visual Basic, available from Microsoft, Inc. of Redmond, Wash., are generally provided with a property sheet which displays a set of properties that can be configured to customize a component associated with the property sheet. In order to further facilitate the customization process, a user interface, or a guide, which essentially controls the customization of the component, can also be provided. Such a user interface serves to direct a user through the steps associated with customizing a component by, for example, prompting a user to modify properties in an intuitive, systematic manner. The use of a customizer, or a user interface which directs a user through the customization of a component, reduces the potential for errors such as the erroneous modification of properties which were accidentally selected to be modified. As larger components, e.g., databases, typically include a substantial number of properties, and, hence, can be configured in many different ways, the use of a customizer is especially advantageous in that the customizer can guide a user through an efficient customization of larger components.

In general, a customizer class provides a user interface, which is specific to a particular component or a particular group of components, that can be used to customize the particular component or the particular group of components. While a customizer can be manifested in any suitable user interface, an example of one suitable user interface is a graphical user interface (GUI).

Figure 2:
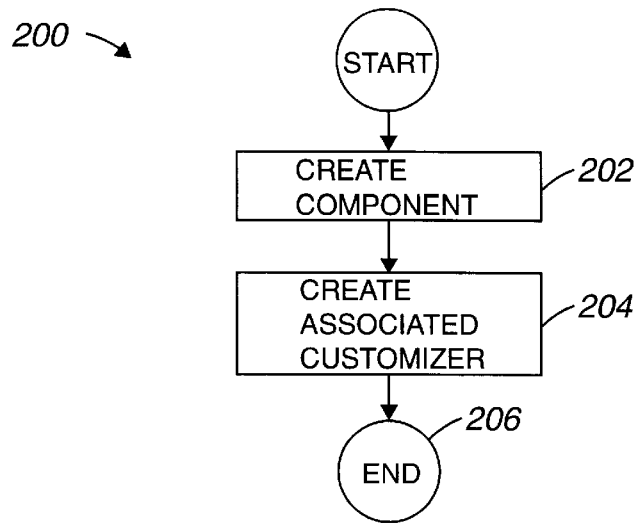
FIG. 2 is a process flow diagram which illustrates the steps associated with the development of a customizer for a software component in accordance with an embodiment of the present invention.

Referring next to FIG. 2, a process flow diagram which illustrates the steps associated with the development of a customizer for a software component will be described in accordance with an embodiment of the present invention. It should be appreciated that although the software component may be any suitable component, in the described embodiment, the software component is a Java™ Bean, which is a reusable software component created using the Java™ programming language available from Sun Microsystems, Inc. of Mountain View, Calif. The development process 200 begins, and at a step 202, a customizable software component is created. After the customizable software component is created, a customizer is created for the software component in a step 204. The steps associated with creating a customizer will be described below with respect to FIG. 3. Once a customizer is created for the software component, the process of developing a customizer for a software component is completed at 206.

It should be appreciated that, in general, a component is an instance of a component class, and a customizer is an instance of a customizer class. The customizer class can be a part of a toolkit which is run to customize a given, e.g., target, component. The toolkit and, hence, the customizer class, can be provided with the component class. In the described embodiment, each Java™ Bean is associated with a customizer class that essentially controls the customization of the Java™ Bean with which the customizer class is associated by guiding a user through the different steps associated with the customization procedure. In a Java™ environment, the customizer class is typically a part of the Abstract Windowing Toolkit (AWT), which is a platform-independent user interface toolkit available from Sun Microsystems, Inc. of Mountain View, Calif. The AWT is provided to facilitate the customization of Java™ Beans.

Figure 3:
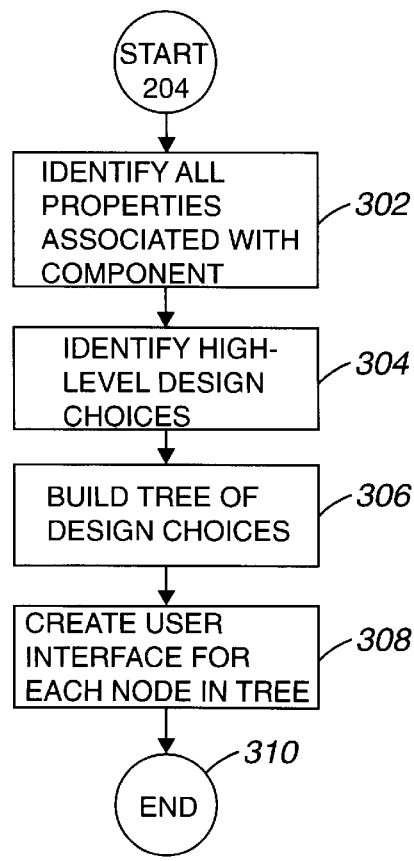
FIG. 3 is a process flow diagram which illustrates the steps associated with creating a customizer in accordance with an embodiment of the present invention.

With reference to FIG. 3, the steps associated with creating a customizer for a component will be described in accordance with an embodiment of the present invention. In other words, step 204 of FIG. 2 will be described. The process of building a customizer begins at a step 302, in which all properties associated with a component, i.e., the component created in step 202 of FIG. 2, are identified. Although the properties associated with a component may vary widely, typical properties can include, by way of example, information which relates to the size of the component and information which relates to the name of the component. Once properties are identified in step 302, process flow proceeds to a step 304 in which high level design choices are identified.

After high level design choices are identified in step 304, a tree of design choices, or a logical listing of design choices, is built in step 306. The tree is an organizational structure that typically includes "branches" which meet at nodes that can be carried by other branches, as will be appreciated by those skilled in the software arts. Branches can be considered to be choices related to decisions which are generally made at nodes, i.e., branches define pathways relating to design choices. The tree can be used to drive detailed design choices and to guide a user through significant pathways of design choices. In general, once a design choice is made at a node, the appropriate branch, or pathway, is followed to another node at which another design choice is made. A user interface, e.g., screen dialog or graphical user interface (GUI), for each node in the tree is created in a step 308. The user interface provided at each node in the tree typically enables properties to be updated to reflect design choices. Once the user interface for each node in the tree is created, the process of creating a customizer is completed at 310.

Figure 4:
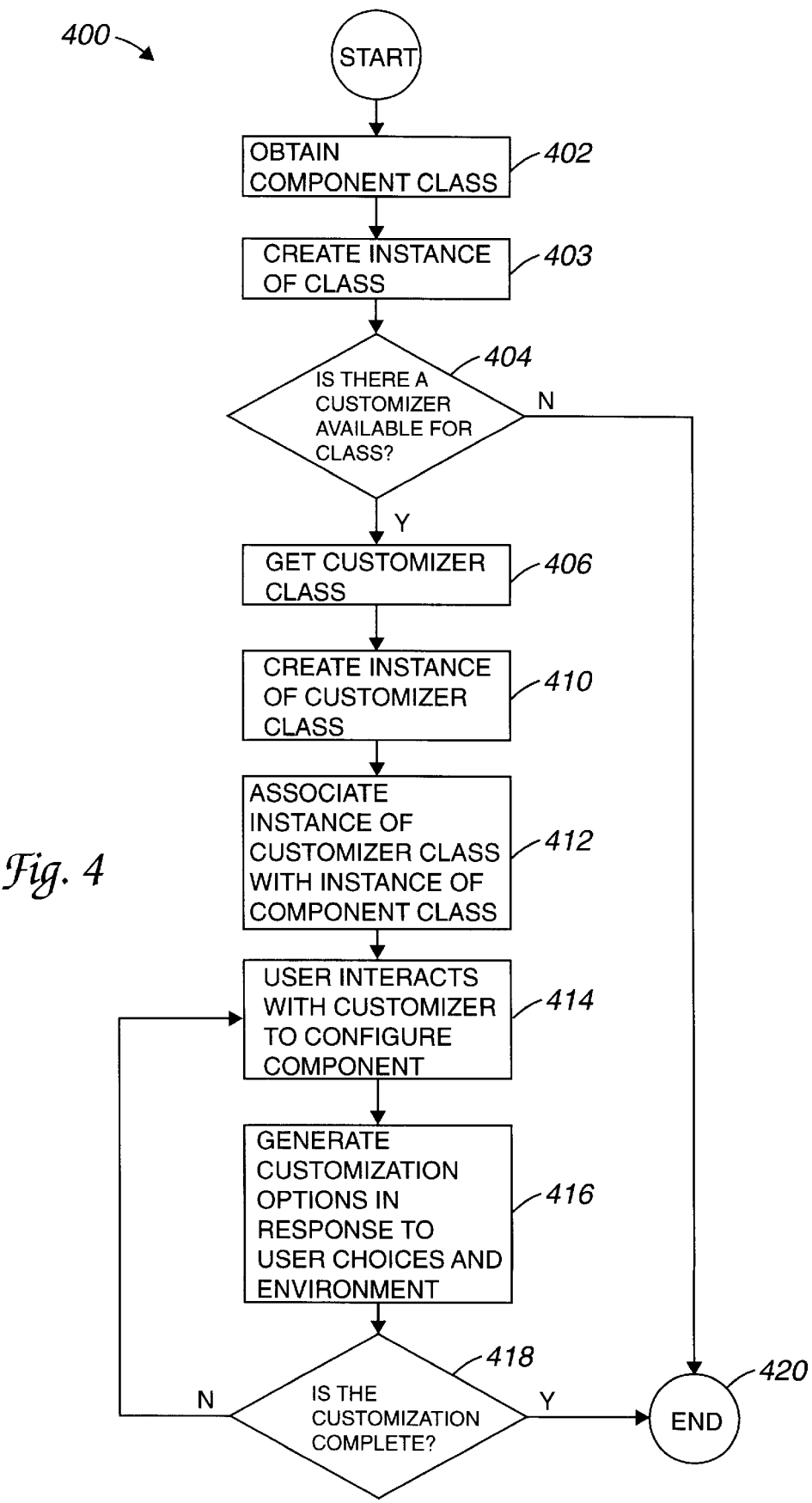
FIG. 4 is a process flow diagram which illustrates the steps associated with customizing a software component in accordance with an embodiment of the present invention.

According to one embodiment, once a customizer is created for a software component, the customizer is displayed on the screen of a computer, and a user can, through a user interface associated with the customizer, modify the properties of the software component. Referring next to FIG. 4, a method of customizing a software component which has an associated customizer will be described in accordance with an embodiment of the present invention. The method 400 of customizing a software component begins, and at a step 402, the component class, or the class that is related to the software component that is to be customized, is obtained. Once the component class is obtained, an instance of the component class is created in a step 403. In other words, a software component, as for example a Java™ Bean, is created. After the instance of the class is created, a determination is made in a step 404 regarding whether a customizer is available for the class. If the determination is that a customizer is not available, then the process of customizing a software component ends at 420.

In the described embodiment, a particular component is not directly "tied" to a given customizer. In other words, once a component is obtained, a customizer, created from a customizer class, that is suitable for use with the component, is obtained separately. By maintaining customizers, or a customizer class, separately from components, the customizers can generally be modified without directly affecting the components.

If the determination in step 404 is that a customizer is available for the class, then in a step 406, the customizer, or the customizer class, is obtained using any suitable method. In the described embodiment, obtaining the customizer class entails the implementation of any suitable search method that can be used to find, or identify, the customizer class that is associated with the component class. Once the customizer class is obtained, an instance of the customizer class is created in a step 410. After the instance of the customizer class is created, in a step 412, the instance of the customizer class is associated with the instance of the component class that was previously created in step 403. Associating the customizer with the component typically entails creating a table in the application builder tool mapping from components to customizers. It should be appreciated that the customizer is associated with the instance of the component class because the customizer is not directly related to the instance of the component class. That is, due to the fact that a component is not directly related to a specific customizer, an association between a component and a suitable customizer that is created from a customizer class is typically forged.

A user interacts with the customizer to configure the component in a step 414. In the described embodiment, the interaction between the user and the customizer occurs through a graphical user interface (GUI), although it should be appreciated that the customizer may be represented by any suitable interface. As previously mentioned, the customizer serves to guide the user through the customization of the component by guiding the user through a tree of design choices. One editing interface which can be provided for each suitable property that is to be edited, e.g., for each property that is a string or a color, and is used to facilitate the actual editing of a property is described in above-referenced U.S. patent application Ser. No. 08/868,038. Such an editor can be instantiated as part of the customizer. In general, a property editor is an instance of a property editor class that enables a known property value, i.e., a value associated with a property, to be edited through any suitable interface, as for example a customizer interface. In one embodiment, a customizer interface includes a property editor, which is instantiated in the customizer interface, and serves to allow a property value to be edited through the use of a graphical user interface (GUI). Developers of software components and, in some embodiments, application developers, can create new property editors for any data types which can be used as properties that are associated with the software components.

The property editor class generally provides many methods for reading and writing property values, and can be instantiated as a part of any suitable customizer, as for example a property sheet. In general, a property editor can be represented in any number of different ways, as for example as a string which can be updated, or as a complex display window which contains strings that can be updated. It should be appreciated that the "higher-level" tool, e.g., an application builder tool, with which the property editor is associated determines exactly how the property editor is to be presented.

The use of property editors in conjunction with a customizer facilitates the addition of properties which can be edited through the use of the customizer. Without property editors, when a new data type and, consequently, a new property, is added to properties associated with a given component, a new customizer must basically be created to reflect the addition of a new, configurable property. The ability to add new property editors to a customizer provides flexibility in the customization of software components. Further, the addition of new property editors to a customizer simplifies the overall customization process. In some embodiments, the user interacts with the customizer until all desired modifications to a component are completed.

During the process of configuring a component, a change made to a property associated with the component can be applied as soon as the change is entered. Alternatively, changes can be accumulated and applied at a time during the customization process that is specified by a customizer. In the described embodiment, it is preferred that changes to a component are updated such that the screen appearance of the component quickly reflects any changes to properties. As a result, the screen representation of a component can generally be considered to be a representation of a current version of the component.

In a step 416, customization options are generated in response to both user choices and the environment in which the component is to be placed. The customization options which are generated are used in part to guide the user through the customization of the component. It should be appreciated that in general, customization options may be provided by a software developer who wrote the customizer. By way of example, customization options relating to the component can be generated based on the database, or databases, that are available to the component. These databases can include, but are not limited to, tables that can be used during the customization of a component. It should be appreciated that modifications made to the component by the user in step 414 are typically incorporated in step 416. For example, if the user interacts with the customizer in step 414 and modifies the name of the component, then in step 416, a component with the changed name is generated.

Customization options can be generated in response to user choices. In other words, when the user modifies one property of a component, customization options related to that property, or to the component in general, can be generated. Customization options, as previously mentioned, can also be generated based on the environment in which a component is to be placed. By way of example a "Jelly-Bean" component, which, in one embodiment, is a simple graphic, can have customization options which relate to the color of the JellyBean. By way of example, if the JellyBean is to be placed into a color environment, customization options relating to the color of the JellyBean can include various colors such as red, blue, and yellow. Alternatively, if the JellyBean is to be placed into a grayscale environment, customization options relating to the color of the JellyBean can include various shades of gray.

After customization options are generated in step 416, process flow moves to a step 418 in which a determination is made regarding whether the customization of the component is complete. If the determination is that the customization is not complete, then process flow returns to step 414 where the user interacts with the customizer to further configure the component. Alternatively, if the determination is that the customization is complete, then the process of customizing the component is completed at 420.

Figure 5A:
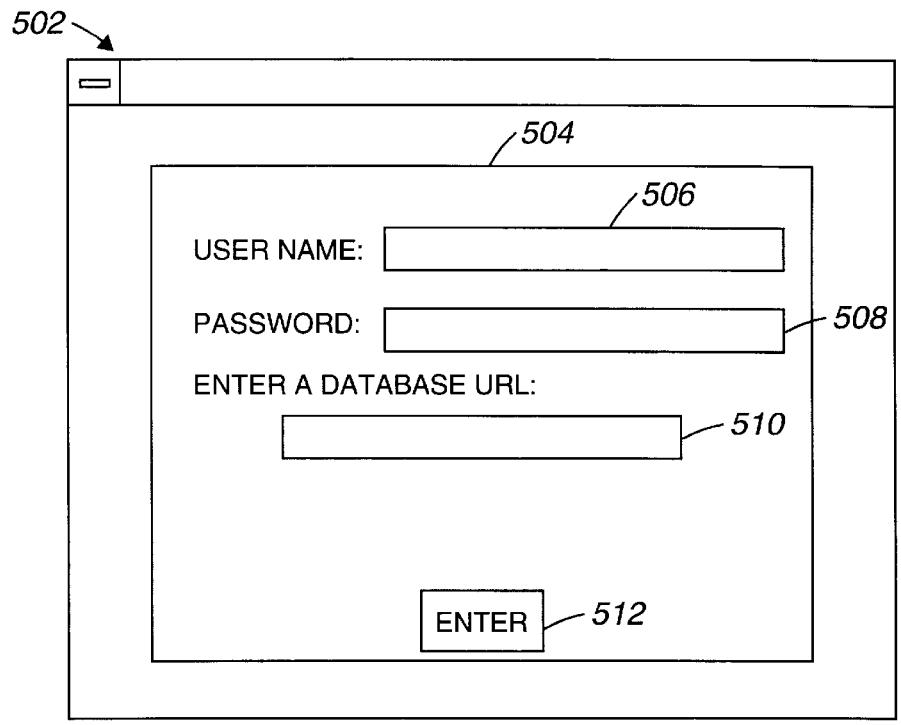
FIG. 5a is a diagrammatic representation of a first customizer screen in accordance with an embodiment of the present invention.

As previously mentioned, components which are to be customized may be widely varied. As such, the customizers that are used to customize different components may also be widely varied. One component which may be customized is a database viewer component. A database viewer component may be associated with a customizer that guides a user through the process of creating an SQL Select for a given target database. It should be appreciated that an SQL Select is typically a string in the database viewer component. FIG. 5a is a diagrammatic representation of an initial customizer window in accordance with an embodiment of the present invention. When a database viewer component is to be customized, an initial customizer window 504, which is contained within an overall display screen 502, is displayed to a user. Initial customizer window 504 includes user-input fields which, as shown, include a user name field 506 which is arranged to accept a typed name of a user and a password field 508 which is arranged to accept a typed password which generally is associated with the name of a user. Initial customizer window 504 further includes a database Universal Reference Language (URL) address field 510 which is arranged to accept a typed name of a database URL. Once a user has inputted the information in fields 506, 508, 510, the user may then press an enter button 512.

Activating button 512 results in the processing of the information in fields 506, 508, 510 by the customizer associated with the database viewer component. Specifically, when button 512 is activated, in the described embodiment, the database viewer component associated with initial customizer window 504 is updated with the user name, the password, and the database URL identified in fields 506, 508, 510, respectively. Then, a connection to the target database identified by the database URL is established, through the use of the user name and the password. A list of tables available to the identified database is then displayed.

Figure 5B:
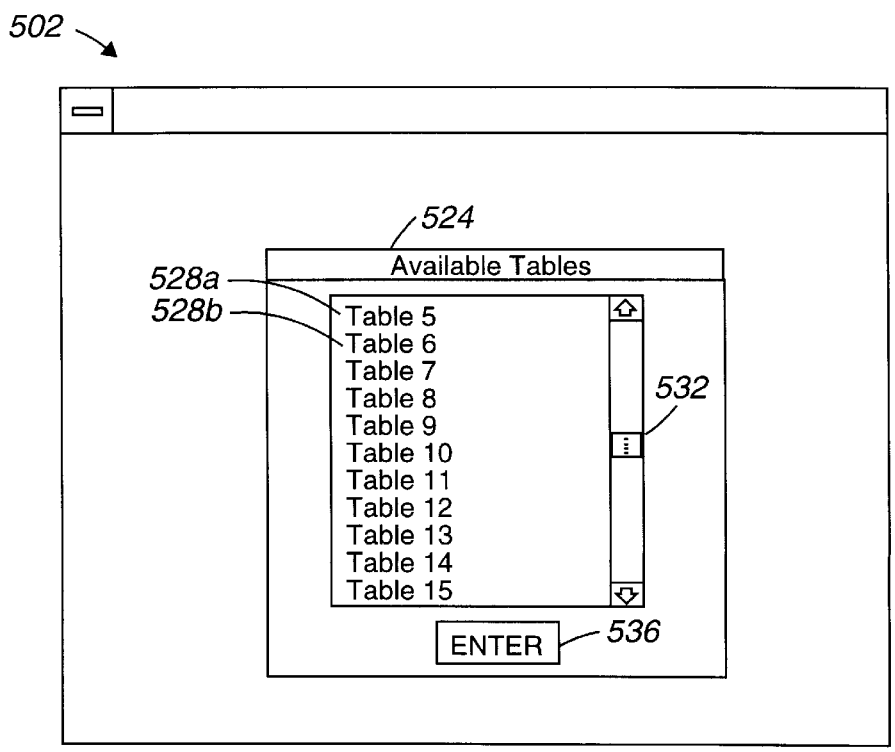
FIG. 5b is a diagrammatic representation of a second customizer screen in accordance with an embodiment of the present invention.

FIG. 5b is a diagrammatic representation of a second customizer window for use in customizing a database viewer component in accordance with the present invention. A second customizer window 524 lists substantially all of the database tables that are available to the identified database. The names 528 of the database tables are displayed in a scrolling list 532 which a user may scroll through to locate the name 528 of a particular database table that he or she wishes to select. It should be appreciated that customizer window 524 is arranged such that the user may only select the name 528 of a database table that is listed in scrolling list 532.

Once the user selects the name 528 of a database table, as for example by highlighting name 528a and pressing an enter button 536 or simply by "clicking on" name 528a, the customizer associated with the database viewer component updates the component to set the database table name associated with the selected database to the selected name 528a. Once the database table name is updated, in one embodiment, the customizer communicates with the target database previously identified by the database URL to locate the names and the types of substantially all database columns associated with the selected database table and, hence, the database table name.

Figure 5C:
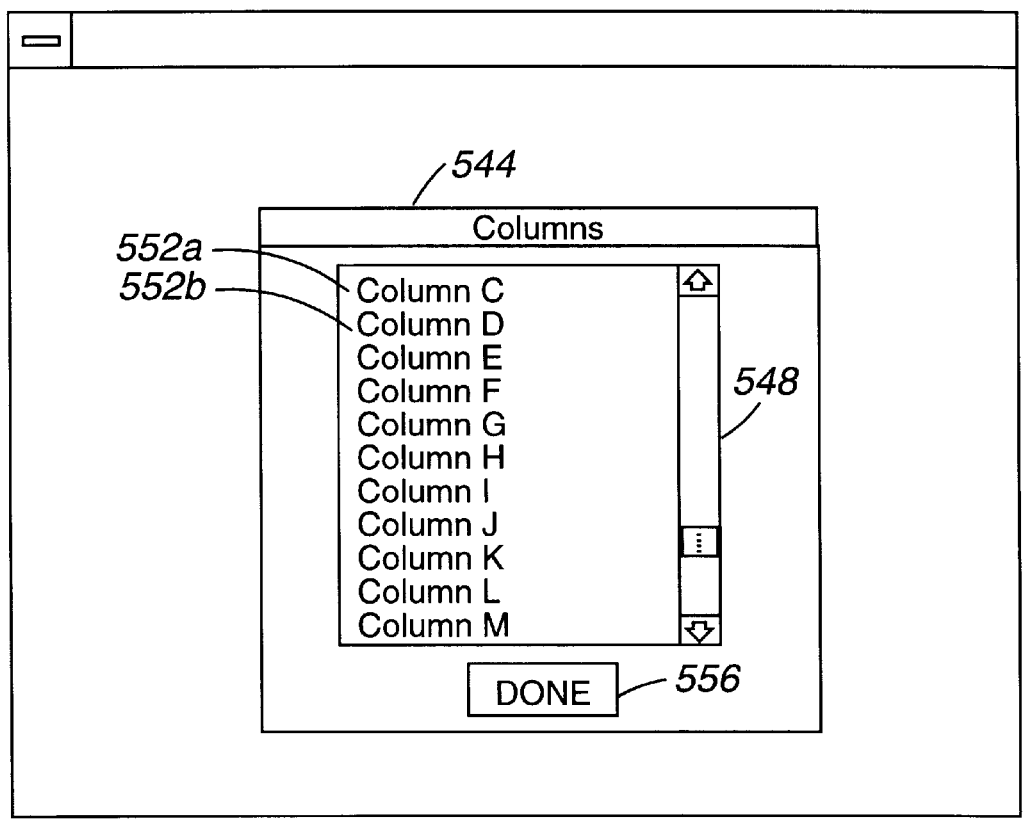
FIG. 5c is a diagrammatic representation of a third customizer screen in accordance with an embodiment of the present invention.

FIG. 5c is a diagrammatic representation of a customizer window which displays the names of database columns associated with the database table selected using second customizer window 524 in accordance with an embodiment of the present invention. A third customizer window 544 includes a scrolling list 548 which displays the names 552 of substantially all columns associated with the database table selected above. The user may then select, e.g., highlight or "click on", names 552 to add or remove the column associated with a selected name 552 from the SQL Select that is associated with the selected, or target, database. That is, the user may select the database columns which may be viewed using the database viewer component associated with the customizer.

Once the user has completed his or her selection of the columns associated with the target database, the user may press a done button 556. Pressing done button 556 results in the customizer updating the SQL Select string in the database viewer component. Once the SQL Select string is updated to reflect the preferences of the user, the customizer exits, and the database viewer component is customized.

Although only a few embodiments of the present invention have been described, it should be understood that the present invention may be embodied in many other specific forms without departing from the spirit or the scope of the present invention. By way of example, steps involved with customizing a software component can be reordered. Steps may also be removed or added without departing from the spirit or the scope of the present invention. For example, the process of customizing a software component can end after the user interacts with the customizer to configure a component, i.e., customization options need not be generated in response to user choices, without departing from the spirit or scope of the present invention. Therefore the described embodiments should be taken as illustrative and not restrictive, and the invention should be defined by the following claims and their full scope of equivalents.

We claim:

1. In a computer system having a component class and a customizer class associated with the component class, a computer-implemented method of customizing a customizer instance of the customizer class for a component instance of the component class for use with an application builder tool environment, said component having at least one associated property, said computer-implemented method comprising:

obtaining a component instance; and identifying a customizer instance arranged to be associated with said component, said customizer instance being arranged to guide a user through the configuration of said component instance, wherein the customizer instance itself is arranged to be personalized by the user.

2. A computer-implemented method of customizing a customizer instance as recited in claim 1 further including:

associating said customizer instance with said component instance when said customizer instance is identified, said customizer instance being arranged to identify editable properties associated with the component instance, whereby different instances of said component class may have different editable properties as defined by their associated customizer instances, said customizer instance being further arranged to modify said property associated with said component instance.

3. A computer-implemented method of customizing a customizer instance as recited in claim 2 further including configuring said component instance using said customizer instance, wherein configuring said component instance involves modifying said property associated with said component instance.

4. A computer-implemented method of customizing a customizer instance as recited in claim 3 further including modifying each property associated with said component instance.

5. A computer-implemented method of customizing a customizer instance as recited in claim 3 wherein said customizer instance has a graphical user interface, said graphical user interface being arranged to facilitate modifying said property associated with said component instance.

6. A computer-implemented method of customizing a customizer instance as recited in claim 3 wherein configuring said component instance using said customizer involves generating customization options associated with said property associated with said component instance.

7. A computer-implemented method of customizing a customizer instance as recited in claim 3 wherein said customizer instance is associated with a customizer class, and searching for said customizer instance includes searching for said customizer class, and creating said customizer instance from said customizer class when said customizer class is found.

8. A computer-implemented method of customizing a customizer instance as recited in claim 1 wherein said component instance has an associated component class, and obtaining said component instance includes instantiating said component instance from said component class.

9. A computer-implemented method of customizing a customizer instance as recited in claim 1 further including creating said customizer instance, wherein creating said customizer instance includes:

identifying said property associated with said component instance;

identifying at least one design choice associated with said property; and creating an organizational structure which includes said design choice.

10. A computer-implemented method of customizing a customizer instance as recited in claim 9 further including creating a user interface for said organizational structure, said user interface being arranged to interact with a user.

11. A computer-implemented method of customizing a customizer instance as recited in claim 1 wherein said component instance is created using the Java™ programming language.

12. A computer-implemented method of customizing a customizer instance as recited in claim 11 wherein said component instance is a Java™ Bean.

13. In a computer system having a component class and a customizer class associated with the component class, a computer-implemented method of customizing a customizer instance of the customizer class a component for use with an application builder tool environment, said component having at least one associated property, said computer-implemented method comprising:

generating customization options associated with said property, said customization options being associated with a customizer instance, said customization options being arranged to modify said property, wherein the customizer itself is arranged to be personalized; and modifying said property using said customization options associated with said customizer instance.

14. A computer-implemented method of customizing a customizer instance as recited in claim 13 further including generating customization options for each property associated with said component instance.

15. A computer-implemented method of customizing a customizer instance as recited in claim 13 further including modifying each property using said customization options.

16. A computer-implemented method of customizing a customizer instance as recited in claim 13, said method further including:

obtaining said customizer instance from said customizer class;

obtaining said component instance from said component class; and associating said customizer instance with said component instance.

17. A computer-implemented method of customizing a customizer instance recited in claim 13 wherein a user interacts with said customizer instance to modify said property.

18. A computer-implemented method of customizing a customizer instance as recited in claim 17 wherein said customization options are generated through said user interaction with said customizer instance.

19. A computer-implemented method of customizing a customizer instance as recited in claim 13 wherein said customizer instance includes:

an organizational structure which includes at least one design option associated with said property; and a user interface associated with said organizational structure, wherein said user interface is used in modifying said property.

20. In a computer system having a component class and a customizer class associated with the component class, a user interface for use in customizing a customizer instance of the customizer class for a component instance of a component class that is to be used with an application builder tool on a computer system, said component instance having at least one associated property, said user interface comprising:

a customizer instance, said customizer instance being associated with said component instance, said customizer instance being arranged to enable said property associated with said component instance to be modified, wherein customization options relating to said property associated with said component are generated through interactions with said customizer, wherein the customizer instance itself is arranged to be personalized.

21. A user interface for use in customizing a customizer instance according to claim 20 wherein said customization options relating to said property associated with said component instance are generated through interactions between a user and said customizer instance.

22. A user interface for use in customizing a customizer instance according to claim 21 wherein said customization options are used to guide said user through customizing said component instance.

23. A user interface for use in customizing a customizer instance according to claim 20 wherein said customizer instance includes an organizational structure, said organizational structure arranged to include at least one design option associated with said property, said organizational structure being further arranged to guide a user through customizing said component instance.

24. In a computer system having a component class and a customizer class associated with the component class, a computer-readable medium comprising computer-readable program code devices configured to cause a computer to:

run a software program on said computer, said software program being an application builder tool;

obtain an instance of a software component for use with said application builder tool, said instance of software component having at least one associated property; and identify an instance of a customizer arranged to be associated with said component instance, said customizer instance further being arranged to guide a user through a configuration of said component, wherein the customizer instance itself can be personalized by the user.

25. A computer-readable medium comprising computer-readable program code devices as recited in claim 24 further including computer-readable program code devices configured to cause said computer to associate said customizer instance with said software component instance when said customizer instance is identified, said customizer instance being arranged to modify said property associated with said software component instance.

26. A computer-readable medium comprising computer-readable program code devices as recited in claim 24 further including computer-readable program code devices configured to cause said computer to modify said property associated with said software component instance to configure said software component instance using said customizer instance.

27. A computer-readable medium comprising computer-readable program code devices as recited in claim 26 further including computer-readable program code devices configured to generate customization options associated with said property associated with said software component instance.

\* \* \* \* \*